United States Patent
Wise

(10) Patent No.: US 9,210,102 B1
(45) Date of Patent: Dec. 8, 2015

(54) SYSTEM TO ENABLE PRIORITY BANDWIDTH FOR PARTICULAR IP ADDRESSES DURING LIMITED DURATION EVENT

(71) Applicant: MTN Satellite Communications, Seattle, WA (US)

(72) Inventor: Robert M Wise, Issaquah, WA (US)

(73) Assignee: Maritime Telecommunications Network Inc., Miramar, FL (US)

(*) Notice: Subject to any disclaimer, the term of this patent is extended or adjusted under 35 U.S.C. 154(b) by 0 days.

(21) Appl. No.: 14/281,824

(22) Filed: May 19, 2014

(51) Int. Cl.
*H04L 12/927* (2013.01)
*H04W 4/24* (2009.01)
*G06Q 20/14* (2012.01)
*H04M 15/00* (2006.01)

(52) U.S. Cl.
CPC ............ *H04L 47/808* (2013.01); *G06Q 20/145* (2013.01); *H04W 4/24* (2013.01); *H04M 15/58* (2013.01)

(58) Field of Classification Search
CPC .... H04L 12/1403; H04M 15/58; H04W 4/24; G06Q 20/145
See application file for complete search history.

(56) References Cited

U.S. PATENT DOCUMENTS

| | | | |
|---|---|---|---|
| 2008/0310609 A1* | 12/2008 | Brady et al. | 379/167.02 |
| 2009/0010200 A1* | 1/2009 | Lauer et al. | 370/316 |
| 2009/0081947 A1* | 3/2009 | Margis | 455/3.02 |
| 2010/0020685 A1* | 1/2010 | Short et al. | 370/230 |
| 2012/0202449 A1* | 8/2012 | Meyer et al. | 455/405 |

\* cited by examiner

*Primary Examiner* — Xavier Szewai Wong
(74) *Attorney, Agent, or Firm* — FSP LLC

(57) ABSTRACT

A bandwidth allocation and quality control system interacts with a manifest for a mobile communication platform (MCP), to identify specific IP addresses designated for bandwidth guarantees and corresponding a particular passenger of the MCP. The system monitors IP addresses of packets communicated between the MCP and a machine communication network external to the MCP, and compares the IP addresses of the packets to the IP addresses corresponding to the particular passenger, and if the packets are from the particular passenger and match one of the corresponding IP addresses, and if a limited duration event is underway for the MCP, to communicate the packets to the external machine network with a bandwidth guarantee.

18 Claims, 7 Drawing Sheets

SYSTEM TO ENABLE PRIORITY BANDWIDTH FOR PARTICULAR IP ADDRESSES DURING LIMITED DURATION EVENT

BACKGROUND

Limited duration events, such as trips aboard moving vessels, may impose bandwidth constraints on network activities by devices of people attending the events. For example, people on a cruise ship may, during the cruise, experience limited bandwidth between the cruise ship and the Internet.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

Preliminaries

Figure 1:
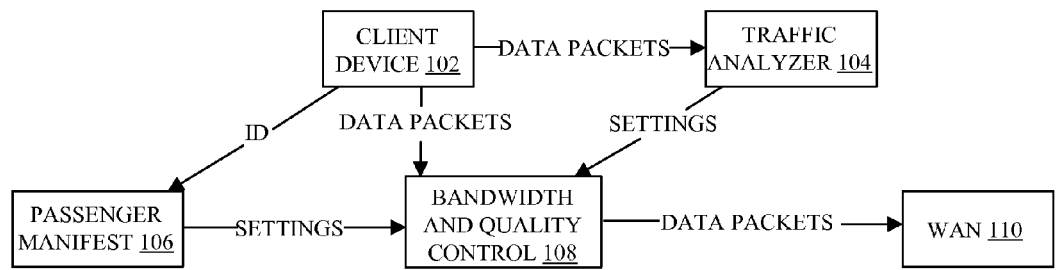
FIG. 1 is a system diagram of an embodiment of a priority bandwidth allocation system.

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones.

Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other.

"Logic" refers to machine memory circuits, machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein.

The techniques and procedures described herein may be implemented via logic distributed in one or more computing devices.

TERMINOLOGY (Wireless) includes WIFI, LTE, WIMAX, 3G, 4G and any other wireless communications technologies.

(CBM) Central Bandwidth Manager—located in a central data center.

(LSS) Local Service Selector—located on individual vessels, remote sites or vehicles.

(MCP) Mobile Communications Platform (includes ships, land vehicles (trucks, trains, cars . . . ), and aircraft).

(Shore side) Refers to any fixed (non-mobile) location in the area of an MCP.

(analog) in this context refers to information encoded in a continuously varying (non quantized or nondiscrete) signal. A continuously variable wave is an example of an analog signal. For example, in the case of wireless phones, analog transmission is where the sound waves of a person's voice are converted directly to specific, continuously-variable characteristics of a radio wave, and vice-versa. Analog signaling is being replaced by digital signaling in most machines and machine networks.

(antenna) in this context refers to a physical device that facilitates the transmission and reception of radio waves. Antennas are used in systems such as radio and television broadcasting, point-to-point radio communication, wireless LAN, mobile phones, radar, and spacecraft communication. Antennas come in a variety of shapes and sizes.

(application program) in this context refers to an application or app.

(application server) in this context refers to logic that provides resources to execute applications and makes features of those applications available to client devices over a network communication channel.

(application) in this context refers to logic that can be independently installed, accessed, and removed from a device, and which executes at lower permission levels and within confines as to functionality and device resource utilization as determined by operating system software. Often referred to as "regular" application logic, as opposed to driver, applet, or system logic; also, logic that causes a computer to perform tasks beyond the basic operation of the computer itself. The term "application" may be abbreviated in some contexts to simply "app". An application may be logic built upon or integrated with operating system logic. Examples of application logic include enterprise software, accounting software, office suites, graphics software, games, web browsers, and media players. Applications may be bundled with the computer and its system software or published separately. Application logic applies the capabilities of a particular computing platform or system software to a particular purpose. Some applications are available in versions for several different platforms; others have narrower requirements and are thus called, for example, a Geography application for Windows or an Android application for education or Linux gaming.

(ASIC) in this context refers to Application-specific integrated circuit.

(BIOS) in this context refers to (Basic Input/Output System), also known as System BIOS, ROM BIOS or PC BIOS is a definition of an interface to input and output devices of a machine. The BIOS are typically initializes and tests the machine I/O components, and loads a bootloader or an operating system from a mass memory device. The BIOS additionally provides abstraction layer for the hardware, i.e. a consistent way for application programs and operating systems to interact with the keyboard, display, and other input/output devices. Variations in the system hardware are hidden by the BIOS from programs that use BIOS services instead of directly accessing the hardware. Many operating systems ignore the abstraction layer provided by the BIOS and access the hardware components directly. The Unified Extensible Firmware Interface (UEFI) is a specification that defines a software interface between an operating system and platform firmware. UEFI is meant to replace the Basic Input/Output System (BIOS) firmware interface.

(bridge) in this context refers to logic to enable two or more communication networks, or two or more network segments, to create an aggregate network. Bridging is distinct from routing which allows the networks to communicate independently as separate networks. A network bridge is a network device that connects multiple network segments.

(browser) in this context refers to logic that is operated by a device to access content and logic provided by Internet sites over a machine network. Browser logic provides a human-friendly interface to locate, access, utilize, and display content and logic encoded by web sites or otherwise available from servers of a network (such as the Internet).

(bus) in this context refers to a collection of coordinated conductors through which data is transmitted from one part of a device to another. You can think of a bus as a highway on which data travels within a computer. The term bus may refer to an internal bus, a bus that connects all the internal computer components to the CPU and main memory. There's also an expansion bus that enables expansion boards to access the CPU and memory. Types of internal busses are the address bus and the data bus. The data bus transfers actual data whereas the address bus transfers information about where the data is located in machine memory. There are also external busses such as USB and Firewire. The size of a bus, known as its width, is important because it determines how much data can be transmitted at one time. For example, a 16-bit bus can transmit 16 bits of data, whereas a 32-bit bus can transmit 32 bits of data. Every bus has a clock speed. A fast bus allows data to be transferred faster, which makes applications run faster.

(cellular network) in this context refers to (mobile network) logic implementing a radio network distributed over land areas called cells, each served by at least one fixed-location transceiver, known as a cell site or base station. In a cellular network, each cell uses a different set of frequencies from neighboring cells, to avoid interference and provide guaranteed bandwidth within each cell. When joined together these cells provide radio coverage over a wide geographic area. This enables a large number of portable transceivers (e.g., mobile phones, pagers, etc.) to communicate with each other and with fixed transceivers and telephones anywhere in the network, via base stations, even if some of the transceivers are moving through more than one cell during transmission.

(client device) in this context refers to any machine that interfaces to a machine network to obtain resources from one or more server systems.

(CPU) in this context refers to (Central Processing Unit), an electronic circuit that operates as a main and general purpose execution component for device logic.

(database server) in this context refers to one or more server machines that provide storage and access (queries against) database(s) on behalf of client devices.

(database) in this context refers to an organized collection of data (states of matter representing values, symbols, or control signals to device logic), structured typically into tables that comprise 'rows' and 'columns', although this structure is not implemented in every case. One column of a table is often designated a 'key' for purposes of creating indexes to rapidly search the database.

(DSP) in this context refers to (Digital Signal Processor).

(firewall) in this context refers to a network security system that controls the incoming and outgoing network traffic by analyzing the data packets and determining whether they should be allowed through or not, based on a rule set. A firewall establishes a barrier between a trusted, secure internal network and another network (e.g., the Internet) that is not assumed to be secure and trusted. Logic that controls incoming and outgoing network traffic by analyzing the data packets and determining whether they should be allowed through into a protected network, or not, based on a rule set. A firewall establishes a barrier between a trusted, secure internal network and another network (e.g., the Internet) that is not assumed to be secure and trusted.

(FPGA) in this context refers to field programmable gate array.

(gateway) in this context refers to a network device that serves as an interface to another network. Within enterprises, the gateway routes traffic from an internal network (e.g., LAN) to a wide area network such as the Internet. In homes, the gateway may be provided by the ISP that connects the home to the Internet. In enterprises, the gateway node often acts as a proxy server and a firewall.

(hard disk) in this context refers to hard drive.

(HTML) in this context refers to HyperText Markup Language, a standard markup language used to define web pages on the Internet for viewing and interaction with web browsers.

(IP) in this context refers to (Internet Protocol) a primary protocol in the Internet protocol suite designed to enable delivery of data packets from a source device to a destination device based on an address (i.e., an IP address). IP defines datagram structures that encapsulate the data to be delivered. It also defines addressing mechanisms to identify the datagram source and destination devices. IP is the protocol used for communicating data across a packet-switched network used in most publicly accessible networks today. Connections that mobile devices make to GPRS, 3G and similar networks are made using IP.

(LAN) in this context refers to logic implementing a network that interconnects computers and devices in a defined area such as a home, school, computer laboratory, or office building. LANs, in contrast to wide area networks (WANs), include usually higher data-transfer rates, smaller geographic area, and lack of a need for leased telecommunication lines. Ethernet over twisted pair cabling, and Wi-Fi (Wireless LANs, or WLANs) are two common technologies currently used to build LANs.

(load balancing) in this context refers to a resource cluster and associated logic for distributing workloads across multiple components or communication links. Load balancing may attempt to optimize resource utilization in an even fashion, maximize throughput, minimize response time, and avoid overloads. Because it utilizes multiple components, load balancing may increase reliability through redundancy.

(memory) in this context refers to a device having a machine interface and storing data in the form of an altered material/energy configuration. Two common types of device memory are SAM, or Sequential Access Memory and RAM, or Random Access Memory. Data on SAM devices is read and written in a sequence, while data on a RAM device is read or written in any order. Examples of SAM devices include CD-ROMS and magnetic tape. RAM devices include flash drives and solid state hard drives. RAM is usually faster than SAM. Other examples of device memory are hard drives, flash drives, optical discs and RAM chips.

(mobile device) in this context refers to any device that includes logic to communicate over a machine network and having a form factor compatible with being carried conveniently by a single human operator. Mobile devices typically have wireless communications capability via WAPs or cellular networks.

(modem) in this context refers to (modulator-demodulator) a device that modulates a carrier signal to encode digital information, and also demodulates such a carrier signal to decode the transmitted information.

(OS) in this context refers to logic that manages device hardware resources and provides common services for application logic. The operating system is a component of many devices, such as computers and mobile phones. Application logic usually requires an operating system in order to function. Operating systems typically manage utilization of device resources, such as I/O devices, displays, processor utilization, memory, mass storage, and printing. The operating system acts as an intermediary between applications and the hardware resources, although applications are often (though not always, in the case of virtual machines) executed directly by the device hardware (e.g., one or more CPUs) and will frequently make system calls to the operating system, or be interrupted by it. Operating systems can be found on almost any device that contains a programmable processor or controller, from cellular phones and video game consoles to supercomputers and web servers.

(PC) in this context refers to (personal computer) a data processing and rendering device configured to be associated with one, or at most a small subset, of human users.

(processor) in this context refers to any circuit or virtual circuit (a physical circuit emulated by logic executing on an actual processor) that manipulates data values according to control signals (e.g., 'commands', 'op codes', 'machine code', etc.) and which produces corresponding output signals that are applied to operate a machine.

(RAM) in this context refers to (Random-Access Memory) a type of memory that is fast relative to other (e.g., nonvolatile) memory is a device, but is volatile, meaning stored information is lost when electric power is removed. RAM is also typically freely addressable, meaning addressability is not constrained to block or sequential access. For these reasons, it is useful only for temporary storage of data that requires fast access. A device will typically have RAM and some kind non-volatile memory to store a copy of all logic (i.e., 'code' and 'data') that needs to be maintained when the device is powered off or that specific logic is not executing on the device. Both the OS and application software typically use RAM.

(ROM) in this context refers to device memory containing data that normally can only be read, not written to. Unlike a computer's random access memory (RAM), the data in ROM is not lost when the computer power is turned off. The data on the ROM can usually be loaded into the RAM if needed. "Read-only memory" may in fact be writable memory, but the process of writing data is comparatively slow and infrequent as compared to RAM, and often does not permit the addressing flexibility that RAM does.

(router) in this context refers to logic that distributes digital information that is contained within a data packet. Each data packet contains address information that a router can use to determine if the source and destination are on the same network, or if the data packet must be transferred from one network to another. This transfer to another type of network is achieved by encapsulating the data with network specific protocol header information. When multiple routers are used in a large collection of interconnected networks, the routers exchange information about target system addresses, so that each router can build up a table showing the preferred paths between any two systems on the interconnected networks.

(satellite) in this context refers to a space vehicle that orbits the earth which contains one or more radio transponders that receive and retransmit signals to and from the earth.

(sensor) in this context refers to a device or composition of matter that responds to a physical stimulus (as heat, light, sound, pressure, magnetism, or a particular motion) and transmits a resulting impulse (as for measurement or operating a control).

(server) in this context refers to logic designed to respond to requests for functionality from client logic that interacts with the server logic via a request/response model, often over a network. Thus, the server performs some operation utilizing the underlying resources of the device or devices hosting the server, on behalf of clients (request submitters). The client logic either executes on the same device or devices as the server logic, or interacts with the server logic through a machine data network.

(switch) in this context refers to logic that filters and forwards packets between network segments.

(tablet) in this context refers to a data processing and rendering device characterized by a flat, portable form factor designed around a user interface based on contact with a display surface (USB) in this context refers to a standard for a wired connection between two electronic devices, including a mobile phone and a desktop computer. The connection is made by a cable that has a connector at both ends. Universal Serial Bus (USB) is an industry standard developed in the mid-1990s that defines the cables, connectors and communications protocols used in a bus for connection, communication and power supply between computers and electronic devices, including mobile devices.

(VPN) in this context refers to (Virtual Private Network) a set of communication protocols that allows remote users to securely access a remote network. An example of this technology is when you access your corporate Intranet remotely from your mobile phone. If your company has a VPN server set up, you can enter the connection details on a supported device and join the corporate Intranet with all user rights and privileges you would have if you were physically there. At the same time, the connection remains secure from unauthorized access. Logic extending a private network across a public network, such as the Internet, enabling a device to send and receive data across shared or public networks as if it were directly connected to the private network, while benefiting from the functionality, security and management policies of the private network. This is accomplished by establishing a virtual point-to-point connection through the use of dedicated connections, encryption, or a combination of the two.

(WAN) in this context refers to (Wide Area Network) a network that provides data communications to a larger number of users than are usually served by a local area network (LAN) and is usually spread over a larger geographic area than that of a LAN. Logic implementing a network that covers a broad area (e.g., a telecommunications network that links across metropolitan, regional, or national boundaries) using private or public network transports. Business and government entities utilize WANs to relay data among employees, clients, buyers, and suppliers from various geographical locations. The Internet can be considered a WAN.

(WAP) in this context refers to (wireless access point) a device that makes a wireless interface to a network available to client devices. Examples of wireless network access points are WiFi "hotspots" and 3G and 4G cellular hotspot wireless access point, a device or system including radio transceivers that convert digital information to and from radio signals that can be exchanged with other wireless communication devices. The most basic forms of wireless access points simply for wireless connections. A wireless access point that includes the ability of DHCP and network address translation (NAT) is typically called a wireless gateway.

(web server) in this context refers to a device or device system that delivers web pages in response to requests for the web pages from web browsers. Also, logic to communicate web pages at the request of clients, most typically using the Hypertext Transfer Protocol (HTTP). The server communicates HTML documents and any additional content that may be included by a document, such as images, style sheets and scripts, as well as content referenced by certain types of links (pointers) in the web pages. A user agent, commonly a web browser or web crawler, initiates communication with the web server by making a request for a resource using (typically) HTTP, and the server responds with the content of that resource or an error message if unable to do so. The resource is typically a file on the server's secondary storage, but this is not necessarily the case. Many web servers have a capability of receiving content from clients. This feature is used for submitting web forms, including uploading of files.

(web server) in this context refers to a device or device system that delivers web pages in response to requests for the web pages from web browsers. Also, logic to communicate web pages at the request of clients, most typically using the Hypertext Transfer Protocol (HTTP). The server communicates HTML documents and any additional content that may be included by a document, such as images, style sheets and scripts, as well as content referenced by certain types of links (pointers) in the web pages. A user agent, commonly a web browser or web crawler, initiates communication with the web server by making a request for a resource using (typically) HTTP, and the server responds with the content of that resource or an error message if unable to do so. The resource is typically a file on the server's secondary storage, but this is not necessarily the case. Many web servers have a capability of receiving content from clients. This feature is used for submitting web forms, including uploading of files.

(WiFi) in this context refers to (also spelled Wi-Fi) logic that allows an electronic device to exchange data with another device or connect to a machine network such as the Internet wirelessly using radio waves. The term may refer to any logic that the Institute of Electrical and Electronics Engineers' (IEEE) 802.11 standards". The term "Wi-Fi" may thus be used as a synonym for "WLAN". A device comprising Wi-Fi (such as a personal computer, video-game console, smartphone, digital camera, tablet or digital audio player) can connect to a network resource such as the Internet via a wireless network access point. WiFi can refer to wireless local area network (WLAN) communication logic and techniques that are based on the Institute of Electrical and Electronics Engineers' (IEEE) 802.11 standards. Wi-Fi is a WLAN (Wireless Local Area Network) technology.

(WML) in this context refers to Wireless Markup Language An industry-standard markup language for creating special, small web sites optimized for phones. WML was a core feature of the WAP 1.x standard. WML has generally been phased out in favor of the newer xHTML standard, part of WAP 2.0. Most phones support both WAP 1.x (WML and WAP 2.0 (XHTML). Older phones may only support WAP 1.x (WML) sites.

(XML) in this context refers to eXtensible Markup Language. A standard that forms the basis for most modern markup languages. XML is an extremely flexible format that only defines "ground rules" for other languages that define a format for structured data designed to be interpreted by software on devices. XML by itself is not a data format. Examples of XML-based standards include xHTML, for creating web pages, RSS, for feeds of new information (such as news headlines), and SyncML, for managing personal data such as contacts, email, files, and events.

Overview

A bandwidth allocation and quality control system for a mobile communication platform (MCP) interacts with a passenger manifest to identify specific IP addresses designated for bandwidth guarantees and corresponding a particular passenger of the MCP. The system monitors IP addresses of packets communicated between the MCP and a machine communication network external to the MCP and compares the IP addresses of the packets to the IP addresses corresponding to the particular passenger, and if the packets are from the particular passenger and match one of the corresponding IP addresses, and if a limited duration event is underway for the MCP, to communicate the packets to the external machine network with a bandwidth guarantee.

The system may interact with the manifest for a mobile communication platform (MCP), to identify specific data packet types specifically excluded from the bandwidth guarantees and corresponding a particular passenger of the MCP for the duration of the event. The system may identify audio or video packets and specifically exclude these packets from the bandwidth guarantees for a particular passenger of the MCP for the duration of the event. The system may specifically exclude packets from pre-determined consumer web sites from any bandwidth guarantees corresponding to IP addresses configured for bandwidth guarantees for a particular passenger of the MCP. The system may associate the specific IP addresses designated for bandwidth guarantees with the particular passenger for the duration of the event only upon condition of a payment to secure the bandwidth guarantees. The system may implement a passenger manifest organization in a machine memory, the manifest organization correlating the specific person's identity to identities of at least one mobile communication device, and further correlating the person's identity to the IP addresses to receive bandwidth guarantees for the duration of the event.

Description

In one embodiment a bandwidth allocation and quality control system is adapted to respond to pre-configure particular IP addresses which in turn are associated with particular customers (particular people or devices of those particular people) for a limited duration event, such as a cruise or a commute. In another embodiment, it is not a particular IP address or addresses associated with a customer that are given priority bandwidth and/or quality of service. Rather, it is a type of communication traffic, in particular traffic within a secure communication channel. This type of traffic is encapsulated within an encrypted channel. One example is a virtual private network channel.

In the latter embodiment, a connection-time session analysis may be performed to identify traffic that is being encapsulated into a secure channel. Analysis may continue during the communication session to monitor the type of communication traffic and determine if it qualifies as a secure connection. If it does, bandwidth allocation and/or quality of service parameters are applied to that communication session but only during a limited duration event. In one embodiment the event is a cruise or commute on a moving vessel such as a ship, a bus, a train, or an airplane.

The system may utilize Deep Packet Inspection (DPI) (also called complete packet inspection and Information eXtraction—IX-), which is a form of computer network packet filtering that examines the data part (and possibly also the header) of a packet as it passes an inspection point, searching for certain attributes, protocols, and/or patterns that meet defined criteria, in order to classify the traffic. There are multiple headers for IP packets; network equipment may in some cases inspect and analyze the first of these (the IP header). In some cases the second header (TCP, UDP etc.) may also be inspected. In some cases, the data payloads of the packets are also inspected and analyzed.

There are multiple ways to acquire packets for deep packet inspection. Using port mirroring is one way, as well as utilizing an optical or electrical splitter.

Specific IP addresses, domain names, uniform resource locators, or type of traffic may be specifically excluded from the bandwidth guarantees. There includes IP addresses, domain names, or URLs associated with known consumer sites such as Youtube, Vimeo, Amazon, or other sites providing consumer video. Certain types of communication may be excluded from priority treatment based on traffic analysis. For example digital video or digital audio streams may be identified using traffic analysis such as packet filtering and may be excluded from receiving priority bandwidth, guaranteed bandwidth, or guaranteed quality of service for a particular customer and for the duration of the event.

Network layer firewalls, also called packet filters, operate at a relatively low level of the TCP/IP protocol stack, and may be utilized or modified to perform the described traffic analysis and bandwidth and QoS allocations. The firewall administrator may define the rules necessary to enable the firewall to carry out these actions.

Network layer firewalls generally fall into two sub-categories, stateful and stateless. Stateful firewalls maintain context about active sessions, and use that "state information" to speed packet processing. Any existing network connection can be described by several properties, including source and destination IP address, UDP or TCP ports, and the current stage of the connection's lifetime (including session initiation, handshaking, data transfer, or completion connection). If a packet does not match an existing connection, it will be evaluated according to the ruleset for new connections. If a packet matches an existing connection based on comparison with the firewall's state table, it will be allowed to pass with possible additional inspection for traffic classification.

Stateless firewalls require less memory, and can be faster for simple filters that require less time to filter than to look up a session. They may also be necessary for filtering stateless network protocols that have no concept of a session. However, they cannot make more complex decisions based on what stage communications between hosts have reached.

Modern firewalls can filter traffic based on many packet attributes like source IP address, source port, destination IP address or port, destination service like WWW or FTP. They can filter based on protocols, TTL values, netblock of originator, of the source, and many other attributes. They may thus be configured to carry out rulesets associated with particular domains/IP addresses/ports etc.

Priority access for particular IP addresses or for secure communications may be associated with and enabled by a payment of the customer. When the customer attempts to establish a connection during a limited duration event on a moving vehicle, several correlations may be made by a connection management logical service that is on the moving vessel and interacting with the person's portable communication device, such as a cell phone or a lap top computer. These correlations may include correlating a person's identify or device with a passenger manifest for the vessel and the limited duration event.

The person identified as a participant in the limited duration event, and with a payment for priority bandwidth or QoS, is correlated with either particular identified IP addresses, or types of traffic such as traffic in a secure channel. Once these correlations are made, additional traffic analysis may be performed to confirm that that a connection or communication traffic from that person's device in fact corresponds to one of the particular IP addresses or types of secure communications associated with the payment and within the limited duration event.

Figure 2:
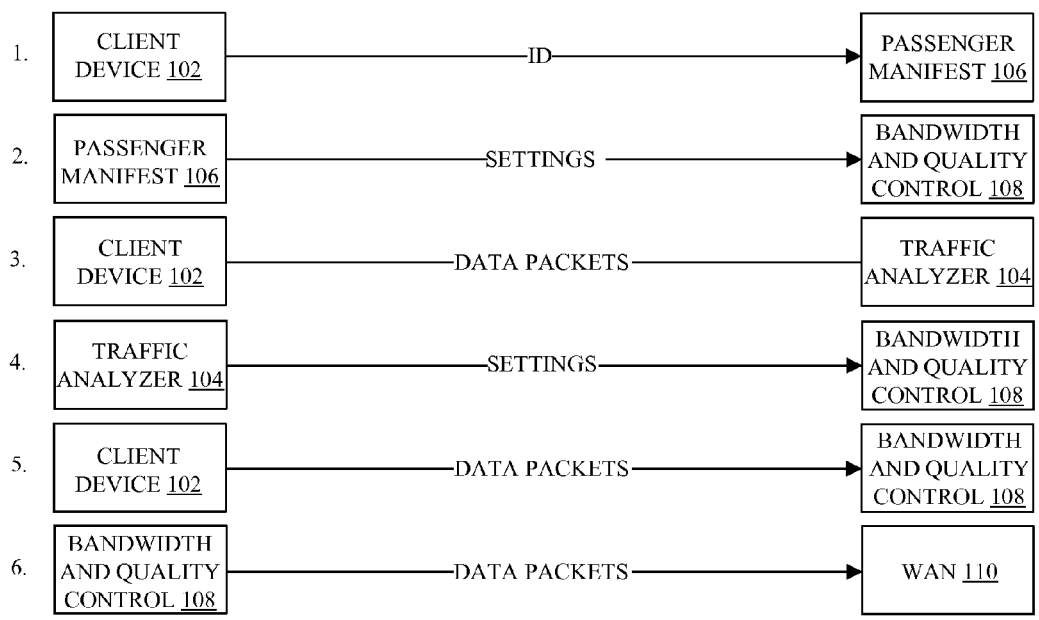
FIG. 2 is an action flow diagram of an embodiment of a priority bandwidth allocation system process.
Figure 3:
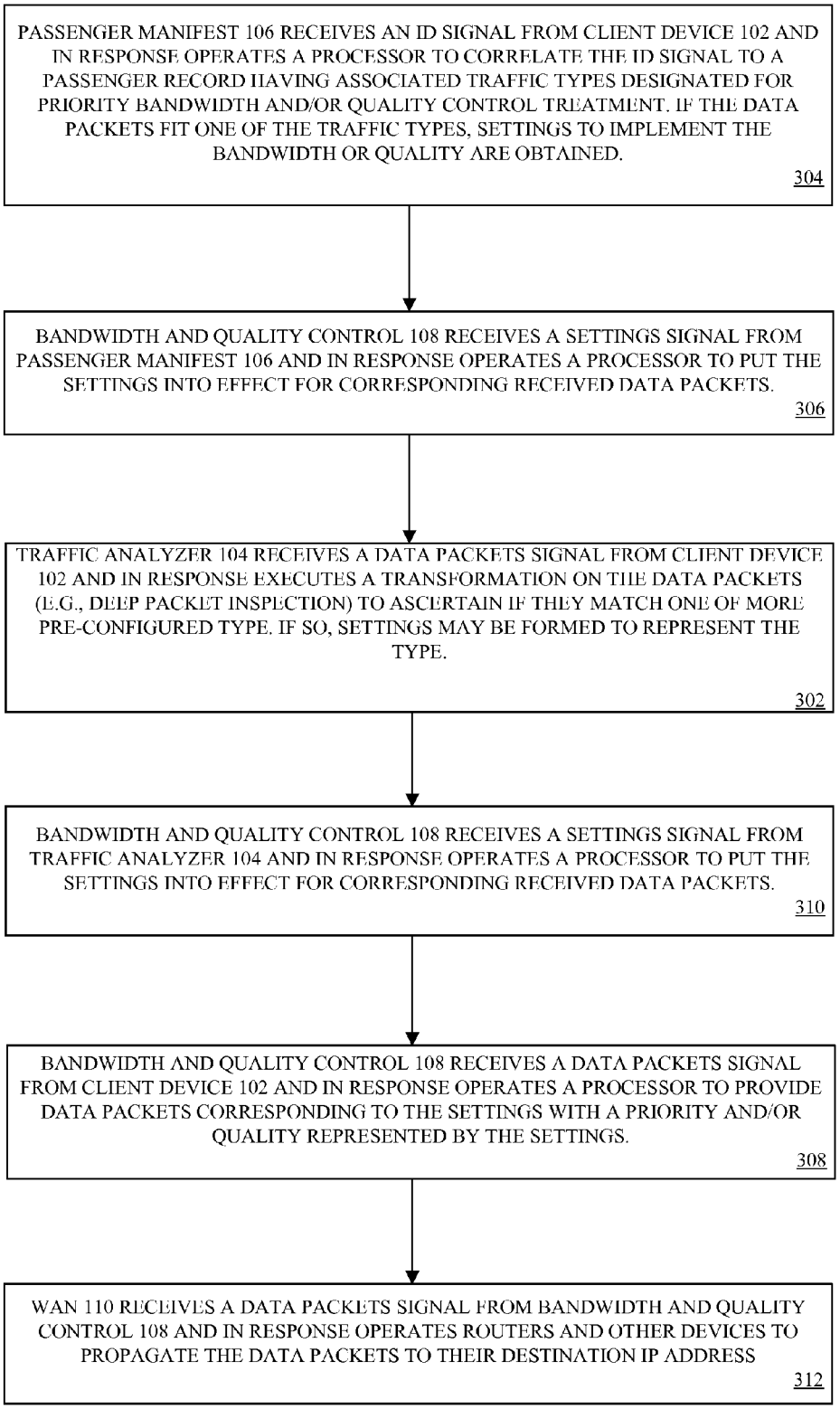
FIG. 3 is a flow chart of an embodiment of a priority bandwidth allocation system process.

FIG. 1 is a system diagram of an embodiment of an embodiment of a priority bandwidth allocation system. FIG. 2 is an action flow diagram of an embodiment of a priority bandwidth allocation process. FIG. 3 is a flow chart of an embodiment of a priority bandwidth allocation process.

FIG. 1 illustrates components of the system. The system comprises a client device 102, a traffic analyzer 104, a passenger manifest 106, a bandwidth and quality control 108, and a WAN 110.

FIG. 2 and FIG. 3 illustrate an example operation of the system embodiment illustrated in FIG. 1. The client device 102 communicates an ID signal to the passenger manifest 106. The passenger manifest 106 receives the ID signal from client device 102 and in response operates a processor to correlate the id signal to a passenger record having associated traffic types designated for priority bandwidth and/or quality control treatment. If the data packets fit one of the traffic types, settings to implement the bandwidth or quality are obtained (304). The passenger manifest 106 communicates a settings signal to the bandwidth and quality control 108. The bandwidth and quality control 108 receives the settings signal from passenger manifest 106 and in response operates a processor to put the settings into effect for corresponding received data packets (306). The client device 102 communicates a data packets signal to the traffic analyzer 104. The traffic analyzer 104 receives the data packets signal from client device 102 and in response executes a transformation on the data packets (e.g., deep packet inspection) to ascertain if they match one of more pre-configured type. If so, settings may be formed to represent the type (302). The traffic analyzer 104 communicates a settings signal to the bandwidth and quality control 108. The bandwidth and quality control 108 receives the settings signal from traffic analyzer 104 and in response operates a processor to put the settings into effect for corresponding received data packets (310). The client device 102 communicates a data packets signal to the bandwidth and quality control 108. The bandwidth and quality control 108 receives the data packets signal from client device 102 and in response operates a processor to provide data packets corresponding to the settings with a priority and/or quality represented by the settings (308). The bandwidth and quality control 108 communicates a data packets signal to the WAN 110. The WAN 110 receives the data packets signal from bandwidth and quality control 108 and in response operates routers and other devices to propagate the data packets to their destination IP address (312).

In one implementation a client device 102 communicates to a network connection (e.g., WAN 110) external to the MCP 504, for example via a satellite antenna 604 to the Internet. Bandwidth and quality control logic 108 operates cooperatively with manifest logic 106 in order to determine IP addresses/traffic types for which a reserved bandwidth or guaranteed quality are configured for a passenger associated with the device 102. The device/passenger association may be made in a number of ways, for instance using device registration with the logic 106, or via authentication credentials provided by the passenger. Traffic analysis logic 104 may be brought into play to determine a type of communications from the device 102.

In one implementation, signals resulting in a recorded charge would be made against the passenger's account with the MCP provider; the presence of the recorded charge, or an obligation of the recorded charge, would enable the device 102 to have guaranteed bandwidth or quality with pre-registered IP addresses or types of traffic.

The operation associated with these actions and transforms may then conclude, or may repeat, periodically or aperiodically.

Figure 4:
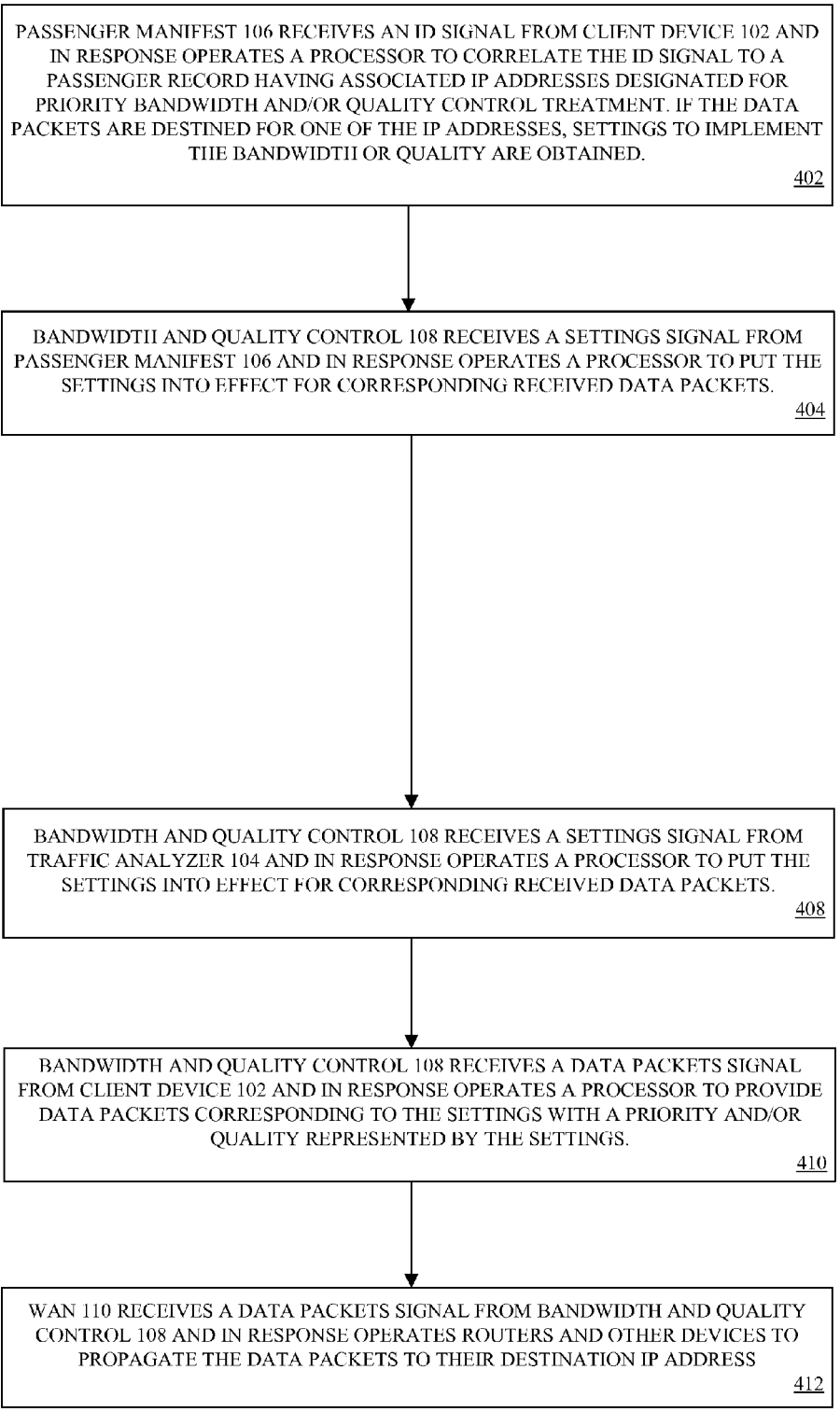
FIG. 4 illustrates an embodiment of a priority bandwidth allocation system process.

FIG. 4 illustrates an embodiment of a priority bandwidth allocation process. The passenger manifest 106 receives the ID signal from client device 102 and in response operates a processor to correlate the id signal to a passenger record having associated IP addresses designated for priority bandwidth and/or quality control treatment. If the data packets fit one of the IP addresses, settings to implement the bandwidth or quality are obtained (304). The passenger manifest 106 communicates a settings signal to the bandwidth and quality control 108. The bandwidth and quality control 108 receives the settings signal from passenger manifest 106 and in response operates a processor to put the settings into effect for corresponding received data packets destined for one or more the IP addresses (306). The client device 102 communicates a data packets signal to the bandwidth and quality control 108. The bandwidth and quality control 108 receives the data packets signal from client device 102 and in response operates a processor to provide data packets corresponding to the settings with a priority and/or quality represented by the settings (308). The bandwidth and quality control 108 communicates a data packets signal to the WAN 110. The WAN 110 receives the data packets signal from bandwidth and quality control 108 and in response operates routers and other devices to propagate the data packets to their destination IP address (312).

Figure 5:
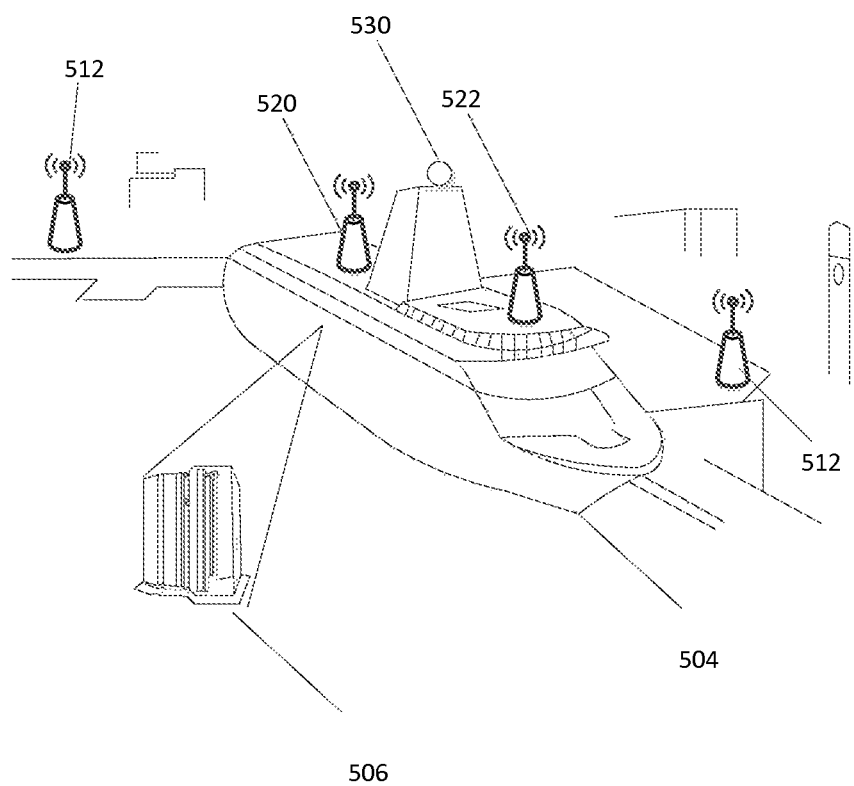
FIG. 5 illustrates an embodiment of an MCP that may be utilized to implement an embodiment of a priority bandwidth allocation system as described herein.

FIG. 5 illustrates an embodiment of an MCP that may be utilized to implement an embodiment of a priority bandwidth allocation system. A mobile communication platform (MCP 504) includes wireless antennas 520, 522 that enable it to communicate with shoreside (terrestrial) antennas 512. The MCP 504 may also include a satellite antenna 530. When the MCP 504 is engaged for a cruise at sea, it may contain thousands of passengers, all of whom must share a limited bandwidth connection to a satellite via antenna 530. Logic 506 aboard the MCP 504 may operate to carry out interactions between a gratuity processing system and a financial transaction system as described herein. Logic 506 aboard the MCP 504 may operate to carry out the preferred bandwidth allocation and/or quality of service procedures for certain IP addresses/traffic types as described herein.

Figure 6:
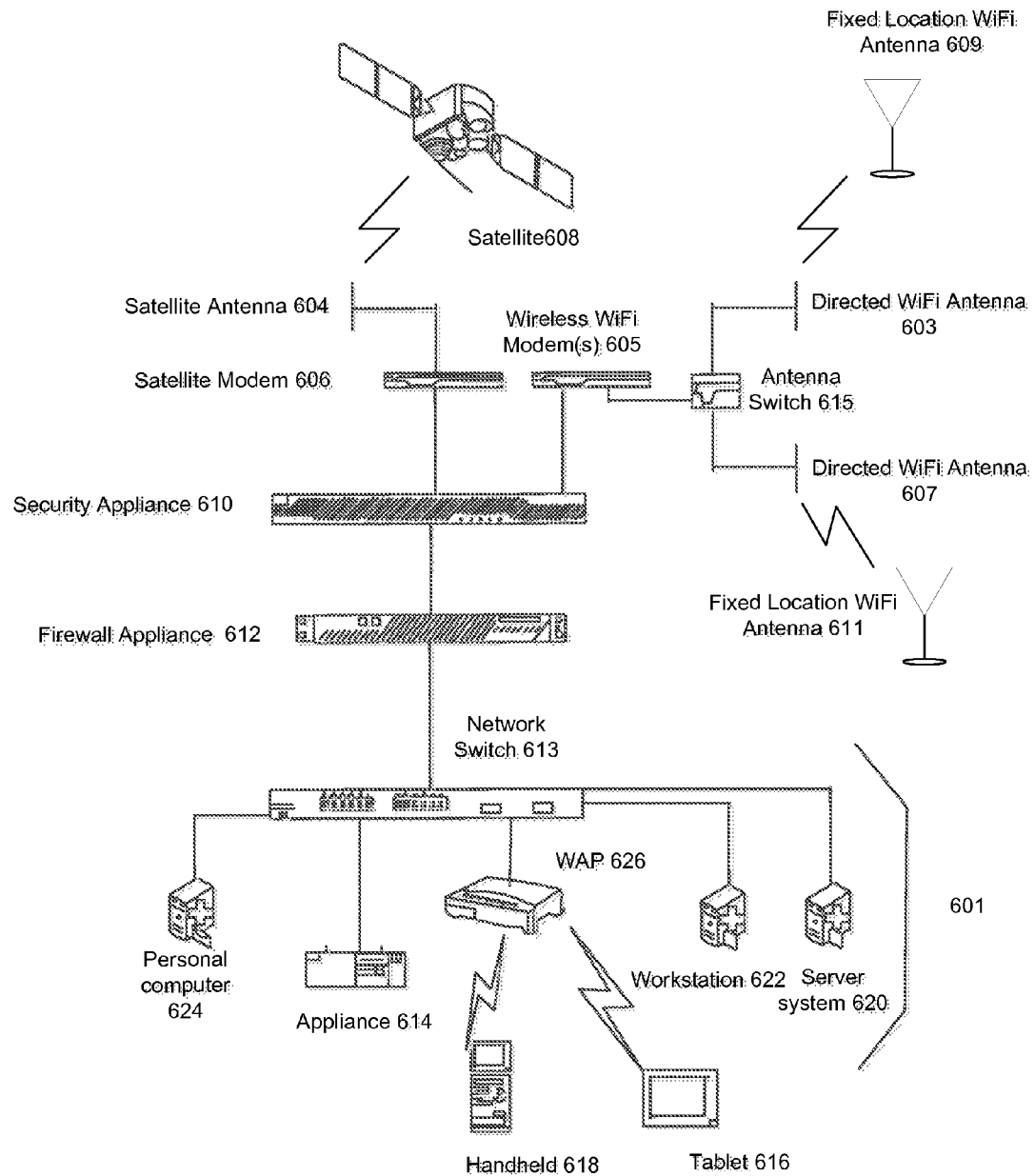
FIG. 6 illustrates an embodiment of a machine network that may be utilized to implement MCP to WAN (e.g., the Internet) communications for an embodiment of a priority bandwidth allocation system as described herein.

FIG. 6 illustrates an embodiment of a machine network that may be utilized to implement MCP to WAN (e.g., the Internet) communications for an embodiment of a priority bandwidth allocation system. Communication is carried out between devices of a local area network (LAN) 601 and a wide area network (WAN) (e.g., the Internet) via a satellite antenna 604 and satellite 608. The LAN 601 includes server systems 620, personal computers 624, appliances 614, tablets 616, handheld (mobile) devices 618, and workstations 622. A WAP 626 provides wireless access to the LAN 601. Of course, a typical LAN includes other devices as well, such as printers, faxes, scanners, etc. The networks are bridged via a system of devices including (in this example) a satellite modem 606, a security appliance 610, a firewall appliance 612, and a network switch 618. The security appliance 610 (e.g., Cisco 5510) provides, for example, firewall and VPN (virtual private network) concentration, intrusion detection, and intrusion prevention. The firewall appliance 612 (e.g., Barracuda) provides, for example, anti-virus and anti-fishing protection for the LAN 601, and web, email, and file content filtering. Communication traffic is switched between the LAN 601 and the WAN by a network switch 618. The WAN may also be accessed in some circumstances via WiFi (e.g., wireless proximity to one or more fixed location WiFi antennas 609 and 611). A WiFi 'modem' 605 may provide signals to an antenna switch 615, which in turn provides the signals to one or more directed WiFi antennas 603, 607. The signals are communicated to and from the antennas 603, 607 using WiFi to one or more fixed location WiFi antennas 609 and 611.

Figure 7:
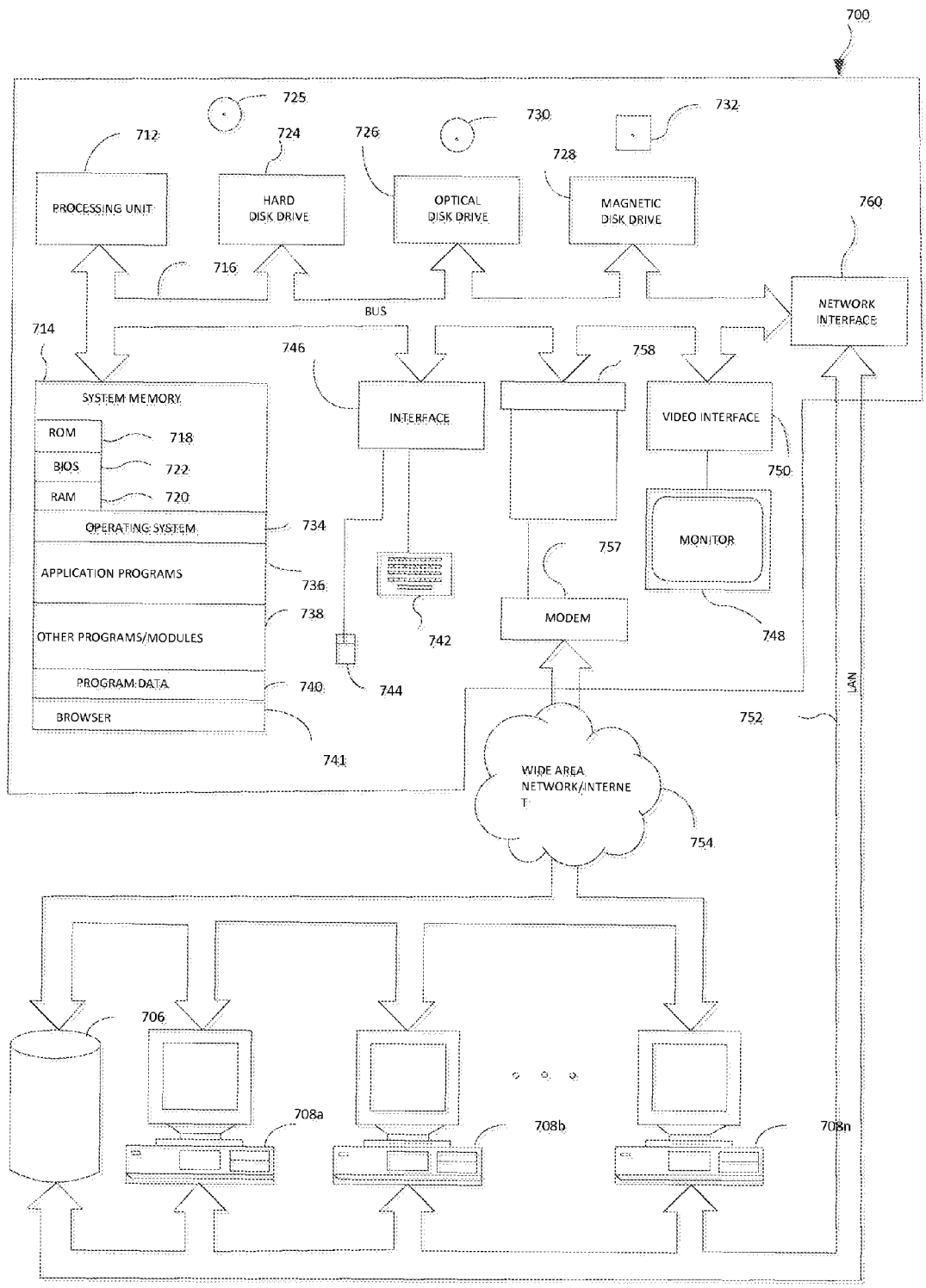
FIG. 7 illustrates an embodiment of a computer system machine and a machine communication network that may implement an embodiment of a priority bandwidth allocation system as described herein.

FIG. 7 illustrates an embodiment of a computer system machine and a machine communication network that may implement an embodiment of a priority bandwidth allocation system. A particular computer system 700 of the machine network may include one or more processing units 712, a system memory 714 and a system bus 716 that couples various system components including the system memory 714 to the processing units 712. The processing units 712 may be any logic processing unit, such as one or more central processing units (CPUs), digital signal processors (DSPs), application-specific integrated circuits (ASICs), field programmable gate arrays (FPGAs), etc. The system bus 716 can employ any known bus structures or architectures, including a memory bus with memory controller, a peripheral bus, and a local bus. The system memory 714 includes read-only memory (ROM) 718 and random access memory (RAM) 720. A basic input/output system (BIOS) 722, which can form part of the ROM 718, contains basic routines that help transfer information between elements within the computer system 700, such as during start-up.

The computer system 700 may also include a plurality of interfaces such as network interface 760, interface 758 supporting modem 757 or any other wireless/wired interfaces.

The computer system 700 may include a hard disk drive 724 for reading from and writing to a hard disk 725, an optical disk drive 726 for reading from and writing to removable optical disks 730, and/or a magnetic disk drive 728 for reading from and writing to magnetic disks 732. The optical disk 730 can be a CD-ROM, while the magnetic disk 732 can be a magnetic floppy disk or diskette. The hard disk drive 724, optical disk drive 726 and magnetic disk drive 728 may communicate with the processing unit 712 via the system bus 716. The hard disk drive 724, optical disk drive 726 and magnetic disk drive 728 may include interfaces or controllers (not shown) coupled between such drives and the system bus 716, as is known by those skilled in the relevant art. The drives 724, 726 and 728, and their associated computer-readable storage media 725, 730, 732, may provide non-volatile and non-transitory storage of computer readable instructions, data structures, program modules and other data for the computer system 700. Although the depicted computer system 700 is illustrated employing a hard disk 724, optical disk 726 and magnetic disk 728, those skilled in the relevant art will appreciate that other types of computer-readable storage media that can store data accessible by a computer may be employed, such as magnetic cassettes, flash memory, digital video disks (DVD), Bernoulli cartridges, RAMs, ROMs, smart cards, etc. For example, computer-readable storage media may include, but is not limited to, random access memory (RAM), read-only memory (ROM), electrically erasable programmable read-only memory (EEPROM), flash memory, compact disc ROM (CD-ROM), digital versatile disks (DVD) or other optical disk storage, magnetic cassettes, magnetic tape, magnetic disk storage or other magnetic storage devices, solid state memory or any other medium which can be used to store the desired information and which may be accessed by processing unit 712.

Program modules can be stored in the system memory 714, such as an operating system 734, one or more application programs 736, other programs or modules 738 and program data 740. Application programs 736 may include instructions that cause the processor(s) 712 to automatically provide dynamic selection of data and telecommunication service providers before or during communications between various devices such as, for example, a mobile device and a landline telephone. Other program modules 738 may include instructions for handling security such as password or other access protection and communications encryption. The system memory 714 may also include communications programs, for example, a Web client or browser 741 for permitting the computer system 700 to access and exchange data with sources such as Web sites of the Internet, corporate intranets, extranets, or other networks and devices as described herein, as well as other server applications on server computing systems. The browser 741 in the depicted embodiment is markup language based, such as Hypertext Markup Language (HTML), Extensible Markup Language (XML) or Wireless Markup Language (WML), and operates with markup languages that use syntactically delimited characters added to the data of a document to represent the structure of the document. A number of Web clients or browsers are commercially available such as those from Mozilla, Google, and Microsoft.

Although illustrated as being stored in the system memory 714, the operating system 734, application programs 736, other programs/modules 738, program data 740 and browser 741 can be stored on the hard disk 725 of the hard disk drive 724, the optical disk 730 of the optical disk drive 726 and/or the magnetic disk 732 of the magnetic disk drive 728.

An operator can enter commands and information into the computer system 700 through input devices such as a touch screen or keyboard 742 and/or a pointing device such as a mouse 744, and/or via a graphical user interface. Other input devices can include a microphone, joystick, game pad, tablet, scanner, etc. These and other input devices are connected to one or more of the processing units 712 through an interface 746 such as a serial port interface that couples to the system bus 716, although other interfaces such as a parallel port, a game port or a wireless interface or a universal serial bus (USB) can be used. A monitor 748 or other display device is coupled to the system bus 716 via a video interface 750, such as a video adapter. The computer system 700 can include other output devices, such as speakers, printers, etc.

The computer system 700 can operate in a networked environment using logical connections to one or more remote computers and/or devices. For example, the computer system 700 can operate in a networked environment using logical connections to one or more mobile devices, landline telephones and other service providers or information servers. Communications may be via a wired and/or wireless network architecture, for instance wired and wireless enterprise-wide computer networks, intranets, extranets, telecommunications networks, cellular networks, paging networks, and other mobile networks. Communication may take place between the computer system 700 and external devices via a WAN 754 or LAN 752. External devices may include other computer system 708*a-n* (collectively, 708) and external storage devices 706.

Implementations and Alternatives

Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory.

In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

What is claimed is:

1. A bandwidth allocation and quality control system for a mobile communication platform (an MCP) and a machine network external to the MCP, comprising:
   a processor;
   a machine memory;
   one or more devices incorporating machine logic that configures the processor and the memory to interact with a manifest for the MCP, to identify specific first Internet Protocol addresses (first IP addresses) designated for bandwidth guarantees and associated with a particular passenger of the MCP;
   one or more devices incorporating machine logic that configures the processor and the memory to monitor second Internet Protocol addresses (second IP addresses) of packets communicated between the MCP and the machine network external to the MCP; and
   one or more devices incorporating machine logic that configures the processor and the memory to compare the second IP addresses to the first IP addresses, and (a) if the packets communicated between the MCP and the machine network external to the MCP are from the particular passenger of the MCP and match one of the first IP addresses, and (b) if a limited duration event for the MCP, then only if (a) and (b) are true to communicate the packets communicated between the MCP and the machine network external to the MCP to the machine network external to the MCP with a bandwidth guarantee.

2. The system of claim 1, further comprising:
   one or more devices incorporating machine logic that configures the processor and the memory to identify from the packets communicated between the MCP and the machine network external to the MCP specific data packet types specifically excluded from the bandwidth guarantees and corresponding to the particular passenger of the MCP for a duration of the limited duration event.

3. The system of claim 2, further comprising:
   one or more devices incorporating machine logic that configures the processor and the memory to identify audio or video packets as the specific data packet types specifically excluded from the bandwidth guarantees and to specifically exclude the audio or video packets from the bandwidth guarantees for the particular passenger of the MCP for the duration of the limited duration event.

4. The system of claim 1, further comprising:
   one or more devices incorporating machine logic configured to identify from the packets communicated between the MCP and the machine network external to the MCP packets from pre-determined consumer web domains from the bandwidth guarantees for the particular passenger of the MCP.

5. The system of claim 1, further comprising:
   one or more devices incorporating machine logic that configures the processor and the memory to associate the first IP addresses with the particular passenger of the MCP for a duration of the limited duration event only upon condition of a payment to secure the bandwidth guarantees.

6. The system of claim 1, further comprising:
   one or more devices incorporating machine logic that configures the processor and the memory to implement the manifest as a machine memory manifest organization, the machine memory manifest organization correlating an identity of the particular passenger of the MCP to at least one mobile communication device to be used by particular passenger of the MCP during the duration of the limited duration event, and correlating the identity of the particular passenger of the MCP to the first IP addresses for a duration of the limited duration event.

7. A bandwidth allocation and quality control method for a mobile communication platform (an MCP) and a machine network external to the MCP, comprising:
   applying a manifest for the MCP to identify specific first Internet Protocol addresses (first IP addresses) designated for bandwidth guarantees and associated with a particular passenger of the MCP;
   monitoring second Internet Protocol addresses (second IP addresses) of packets communicated between the MCP and the machine network external to the MCP; and
   comparing the second IP addresses to the first IP addresses, and (a) if the packets communicated between the MCP and the machine network external to the MCP are from the particular passenger of the MCP and match one of the first IP addresses, and (b) if a limited duration event for the MCP, then only if (a) and (b) are true to configure the machine network external to the MCP to communicate the packets communicated between the MCP and the machine network external to the MCP with a bandwidth guarantee.

8. The method of claim 7, further comprising:
identifying from the packets communicated between the MCP and the machine network external to the MCP specific data packet types specifically excluded from the bandwidth guarantees and corresponding to the particular passenger of the MCP for a duration of the limited duration event.

9. The method of claim 8, further comprising:
identifying audio or video packets as the specific data packet types specifically excluded from the bandwidth guarantees and to specifically exclude the audio or video packets from the bandwidth guarantees for the particular passenger of the MCP for the duration of the limited duration event.

10. The method of claim 7, further comprising:
identifying from the packets communicated between the MCP and the machine network external to the MCP packets from pre-determined consumer web domains from the bandwidth guarantees for the particular passenger of the MCP.

11. The method of claim 7, further comprising:
associating the first IP addresses with the particular passenger of the MCP for a duration of the limited duration event only upon condition of a payment to secure the bandwidth guarantees.

12. The method of claim 7, further comprising:
implementing the manifest as a machine memory manifest organization, the machine memory manifest organization correlating an identity of the particular passenger of the MCP to at least one mobile communication device to be used by particular passenger of the MCP during the duration of the limited duration event, and correlating the identity of the particular passenger of the MCP to the first IP addresses for a duration of the limited duration event.

13. A non-transitory computer-readable storage medium having stored thereon instructions including instructions that, when executed by a processor, configure the processor to perform a method comprising:
applying a manifest for a mobile communication platform (an MCP) that utilizes a machine network external to the MCP to identify specific first Internet Protocol addresses (first IP addresses) designated for bandwidth guarantees over the machine network external to the MCP, the first IP addresses associated with a particular passenger of the MCP;
monitoring second Internet Protocol addresses (second IP addresses) of packets communicated between the MCP and the machine network external to the MCP; and
comparing the second IP addresses to the first IP addresses, and (a) if the packets communicated between the MCP and the machine network external to the MCP are from the particular passenger of the MCP and match one of the first IP addresses, and (b) if a limited duration event for the MCP, then only if (a) and (b) are true to communicate the packets communicated between the MCP and the machine network external to the MCP to the machine network external to the MCP with a bandwidth guarantee.

14. The non-transitory computer-readable storage medium of claim 13, having stored thereon instructions including instructions that, when executed by the processor, further configure the processor to perform:
identifying from the packets communicated between the MCP and the machine network external to the MCP specific data packet types specifically excluded from the bandwidth guarantees and corresponding to the particular passenger of the MCP for a duration of the limited duration event.

15. The non-transitory computer-readable storage medium of claim 14, having stored thereon instructions including instructions that, when executed by the processor, further configure the processor to perform:
identifying audio or video packets as the specific data packet types specifically excluded from the bandwidth guarantees and to specifically exclude the audio or video packets from the bandwidth guarantees for the particular passenger of the MCP for the duration of the limited duration event.

16. The non-transitory computer-readable storage medium of claim 13, having stored thereon instructions including instructions that, when executed by the processor, further configure the processor to perform:
identifying from the packets communicated between the MCP and the machine network external to the MCP packets from pre-determined consumer web domains from the bandwidth guarantees for the particular passenger of the MCP.

17. The non-transitory computer-readable storage medium of claim 13, having stored thereon instructions including instructions that, when executed by the processor, further configure the processor to perform:
associating the first IP addresses with the particular passenger of the MCP for a duration of the limited duration event only upon condition of a payment to secure the bandwidth guarantees.

18. The non-transitory computer-readable storage medium of claim 13, having stored thereon instructions including instructions that, when executed by the processor, further configure the processor to perform:
implementing the manifest as a machine memory manifest organization, the machine memory manifest organization correlating an identity of the particular passenger of the MCP to at least one mobile communication device to be used by particular passenger of the MCP during the duration of the limited duration event, and correlating the identity of the particular passenger of the MCP to the first IP addresses for a duration of the limited duration event.

* * * * *